Figure 1:
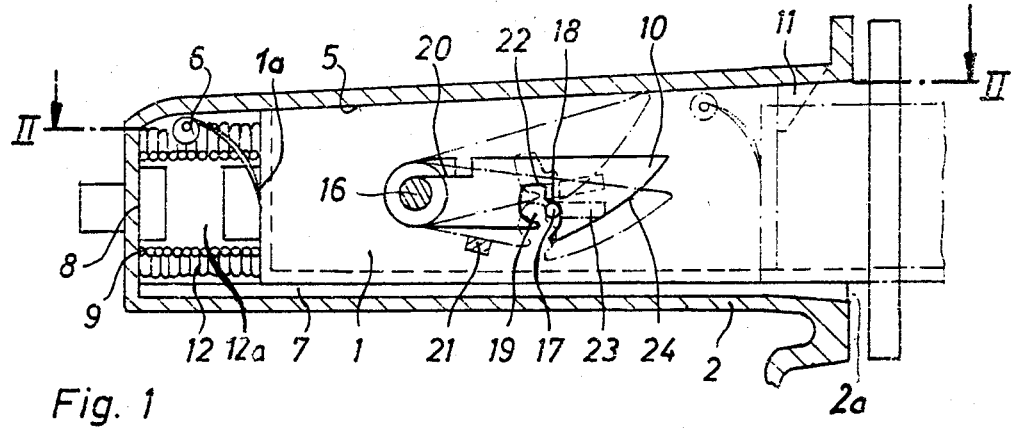

United States Patent [19]
Pflugfelder

[11] Patent Number: 4,596,427
[45] Date of Patent: Jun. 24, 1986

[54] RECEPTACLE OF THE DRAWER TYPE, ESPECIALLY FOR MOTOR VEHICLES

[75] Inventor: Karl Pflugfelder, Neckarsulm, Fed. Rep. of Germany

[73] Assignee: Audi Nsu Auto Union Aktiengesellschaft, Fed. Rep. of Germany

[21] Appl. No.: 570,086

[22] Filed: Jan. 12, 1984

[30] Foreign Application Priority Data

Jan. 13, 1983 [DE] Fed. Rep. of Germany ....... 3300926

[51] Int. Cl.⁴ .............................................. A47B 21/04
[52] U.S. Cl. ................. 312/319; 312/330 R; 312/333
[58] Field of Search .................. 312/345, 330 R, 319, 312/333

[56] References Cited

U.S. PATENT DOCUMENTS

| | | | |
|---|---|---|---|
| 1,066,518 | 7/1913 | Nickol et al. | 312/319 |
| 2,462,397 | 2/1949 | Hendricks | 312/333 |
| 2,593,384 | 4/1952 | Butler | 312/333 |
| 4,494,806 | 1/1985 | Williams et al. | 312/330 |

*Primary Examiner*—William E. Lyddane
*Assistant Examiner*—Joseph Falk
*Attorney, Agent, or Firm*—Kane, Dalsimer, Kane, Sullivan and Kurucz

[57] ABSTRACT

A receptacle for motor vehicles. f.i. an ash tray, comprises a drawer movably supported with a housing between an open and a closed position, a releasable locking means for holding the drawer in its closed position and spring means for moving the drawer in its open position upon release of the locking means. In order to prevent a fast opening under the action of the springs and consequent impact on an abutment in the end position a damper means is provided between drawer and housing which retards the opening movement of the drawer.

2 Claims, 2 Drawing Figures

U.S. Patent  Jun. 24, 1986  4,596,427

RECEPTACLE OF THE DRAWER TYPE, ESPECIALLY FOR MOTOR VEHICLES

This invention refers to a receptacle of the drawer type, especially for motor vehicles, wherein the drawer is supported in a housing and held therein by a releasable locking mechanism in the closed position and being movable into the open position after release of the locking mechanism by a spring arranged between the drawer and the housing. By suitable design of the locking mechanism said release can be effected simply by exerting pressure to the front side of the drawer. After release the spring moves the drawer out of the housing and into its open position, the drawer coming to a sudden stop in its end position. This sudden stop can cause the contents of the drawer to be thrown out of the drawer at least partially. Therefore the user must guide the drawer after release up to its open position in order to prevent a sudden stop with the drawback mentioned above. Such handling, however, is impractical or even dangerous because if the user is the driver his attention is diverted from the traffic and from the road which may cause dangerous situations. A receptacle of the type set forth is f.i. disclosed in German Utility Model No. 8132467.

It is an object of the invention to prevent the drawbacks mentioned above and to provide a receptacle wherein the drawer is smoothly moved to its open end position after release of the locking mechanism.

It is a further object of the invention to provide a receptacle of the type set forth wherein a delayed opening of the drawer is effected by simple means.

A still further object of the invention is to provided a receptacle of the type set forth wherein the opening movement effected by a spring is delayed, but the closing can be effected without substantial delay. In accordance with the invention, these objects are met by providing a damping means between the drawer and the housing, which damping means delays or retards the movement of the drawer into its open position so that a sudden stop in its end position is prevented.

Preferably the damping means is a pneumatic bellows connected on one end to the housing and on its other end to the backside of the drawer, the interior of the bellows being in communication with the atmosphere by a check valve having a valve member which is opened when the drawer is moved from its open into its closed position, said check valve being by-passed by a passage of restricted cross section connecting said interior to the atmosphere so that when the locking mechanism is released air can enter the interior of the bellows only through said restricted passage and consequently the bellows is only slowly filled with air so that the drawer is moved slowly into its open position under the action of the spring.

When the drawer is to be moved into its closed position the check valve is opened under the increased air pressure in the bellows caused by exerting a pressure to the front side of the drawer. By opening the check valve the air can escape rapidly from the bellows so that the closing of the drawer is not retarded. Preferably the open cross section of the check valve is bigger than the cross section of the restricted passage.

A preferred embodiment of the invention is shown in the drawing.

Figure 2:
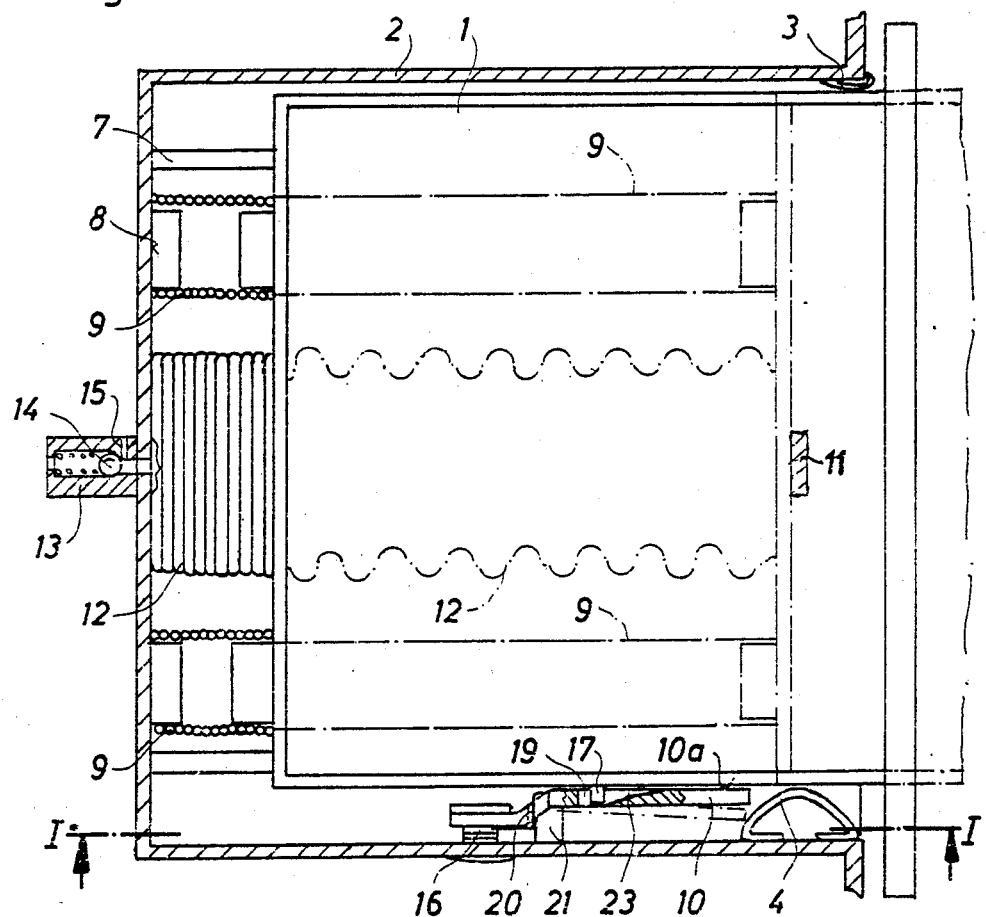

FIG. 1 is a side view of the receptacle with the housing shown in cross section, and FIG. 2 is a cross sectional view taken along line II—II in FIG. 1.

The receptacle shown in the drawings comprises a drawer 1 which is supported for sliding movement within a housing 2 having an open front end 2a. The drawer 1 is guided laterally between spring bows 3 and 4 and is urged against guide rails 7 in the housing 1 by a leaf spring 6 which is attached to the back side 1a of the drawer 1 and abuts against the upper wall 5 of the housing 2. Two coil springs 9 are arranged between the backside 8 of housing 2 and the backside 1a of drawer 1, said springs 9 being prestressed in the closed position of the drawer as shown in the drawings.

The drawer 1 is maintained in its closed position within the housing 2 by a releasable locking mechanism which comprises a latch 10 mounted for rotation upon a bolt 16 which is attached to a side wall of housing 2. The latch 10 is provided on its lower side with a stepped recess 19 with a first step 18 and a second step 22. In the closed position of the drawer 1 the first step 18 engages a pin 17 attached to the adjacent sidewall of the drawer, see FIG. 1, and the drawer is locked in the closed position. For opening the drawer is pushed by slight pressure upon its front side 1b a few millimeters in the drawings to the left whereby the pin 17 comes out of engagement with step 18 and the latch 10 is tilted by a spring 20 into its lower position shown in dot-and-dash lines in FIG. 1 against an abutment 21. In this position the pin 17 engages the second step 22. From this step 22 extends a groove 23 in the drawings to the left which is provided in the side face 10a of latch 10 adjacent to the drawer. Under the action of the springs 9 the drawer 1 slides towards the right whereby the pin 17 slides in groove 23 until it comes in contact with the side face 10a of the latch 10 thereby tilting latch 10 into the dot-and-dash position shown in FIG. 2 which is accomplished by suitable support of the latch upon bolt 16. When the drawer 1 is moved from its open position into the closed position the pin 17 comes at first in contact with the inclined front edge 24 of the latch 10. Thereby the latch 10 is tilted against the action of spring 20 in its upper dot-and-dash position of FIG. 1 until after further displacement of the drawer the pin 17 again engages recess 19 and the latch 10 can tilt under the influence of spring 20 into the starting position shown in full lines in FIG. 1. In this position the drawer is locked in the closed position.

In accordance with the invention a damping means is provided between the drawer 1 and the housing 2 for obtaining a gentle and retarded opening of the drawer. This damping means comprises a pneumatic bellows 12 which is connected at one end to the backside 8 of the housing and at the other end to the backside 1a of the drawer 1. The interior 12a of the bellows 12 is in communication with the atmosphere by a check valve 13 having a spring-loaded valve member 14 and by a passage 15 by-passing check valve 13. When the latch 10 is released in the manner described above the springs 9 tend to move the drawer 1 to the right and thereby expand the bellows 12 whereby the bellows 12 is filled with air through passage 15. The cross-sectional area of passage 15 is chosen under consideration of the pretension of the springs 9 such that the filling of the bellows takes place slowly and therefore the drawer 1 is moved slowly to the right into its opening position until it abuts gently a stop 11 on the housing 2. During this operation the check valve 13 is closed. When the drawer is moved from its open into its closed position the valve member 14 is lifted off its seat by the air compressed in the bellows 12 by such movement of the drawer and that air can escape through the open check valve 13 and also through the passage 15. The cross-sectional area of the check valve 13 is preferably bigger than that of passage 15 so that the closing movement is not delayed.

The invention is not limited to the embodiment shown in the drawings. So the drawer need not be of the type performing a linear movement but can also be of the tilting type as is well known in the art. Therefore the term "drawer" is to be interpreted in a broad sense. Also the check valve and the locking mechanism can be of different known design.

What I claim is:

1. A receptacle, in particular for motor vehicles, comprising a housing, a drawer movably supported within the housing between a closed and an open position, a releasable locking mechanism for holding the drawer in its closed position, and spring means for moving the drawer to its open position after release of the locking mechanism, characterized in that a damping means is provided between the drawer and the housing, said damping means being constructed and arranged to oppose the spring for retarding the movement of the drawer into its open position so that a sudden impact in its open position is prevented; said damping means comprising a variable volume chamber coupled to the drawer to increase a volume of the chamber as the drawer is opened and decrease said volume as the drawer is closed; a check valve disposed between said chamber and the atmosphere, said check valve being arranged to open as said volume is decreased, said check valve having a check valve cross-sectional area; and a restricted air passage by-passing said check-valve to permit air exchange between the chamber and atmosphere and having a passage cross-sectional area smaller than the check valve cross-sectional area.

2. The receptacle of claim 1 wherein said chamber comprises a pneumatic bellows arranged between a backside of the drawer and an adjacent part of the housing.

* * * * *